(12) United States Patent
Whittle (10) Patent No.: US 10,890,076 B1
(45) Date of Patent: Jan. 12, 2021

(54) TURBINE VANE ASSEMBLY HAVING CERAMIC MATRIX COMPOSITE COMPONENTS WITH EXPANDABLE SPAR SUPPORT

(71) Applicant: Rolls-Royce plc, London (GB)

(72) Inventor: Michael J. Whittle, London (GB)

(73) Assignee: Rolls-Royce plc

( * ) Notice: Subject to any disclaimer, the term of this patent is extended or adjusted under 35 U.S.C. 154(b) by 83 days.

(21) Appl. No.: 16/457,076

(22) Filed: Jun. 28, 2019

(51) Int. Cl.
| | |
|---|---|
| *F01D 9/04* | (2006.01) |
| *F01D 25/00* | (2006.01) |
| *F01D 5/14* | (2006.01) |
| *F01D 5/18* | (2006.01) |
| *F01D 5/28* | (2006.01) |

(52) U.S. Cl.
CPC ............ *F01D 9/041* (2013.01); *F01D 5/147* (2013.01); *F01D 5/18* (2013.01); *F01D 5/284* (2013.01); *F01D 25/005* (2013.01); *F05D 2240/12* (2013.01); *F05D 2260/30* (2013.01)

(58) Field of Classification Search
CPC . F01D 5/147; F01D 5/18; F01D 5/284; F01D 9/041; F01D 9/042; F05D 2240/12; F05D 2260/30
See application file for complete search history.

(56) References Cited

U.S. PATENT DOCUMENTS

| | | |
|---|---|---|
| 5,630,700 A | 5/1997 | Olsen et al. |
| 6,000,906 A * | 12/1999 | Draskovich ........... F01D 17/162 415/209.4 |
| 6,325,593 B1 | 12/2001 | Darkins, Jr. et al. |
| 6,514,046 B1 | 2/2003 | Morrison et al. |
| 6,558,114 B1 | 5/2003 | Tapley et al. |
| 6,648,597 B1 | 11/2003 | Widrig et al. |
| 7,452,189 B2 | 11/2008 | Shi et al. |
| 7,762,766 B2 | 7/2010 | Shteyman et al. |
| 7,824,152 B2 * | 11/2010 | Morrison ................ F01D 9/042 415/135 |
| 8,210,803 B2 | 7/2012 | Schaff et al. |
| 8,251,652 B2 | 8/2012 | Campbell et al. |
| 8,292,580 B2 * | 10/2012 | Schiavo .................. F01D 5/189 416/96 A |
| 8,454,303 B2 | 6/2013 | Garcia-Crespo |
| 8,956,105 B2 | 2/2015 | Uskert et al. |
| 9,097,141 B2 | 8/2015 | Paradis |
| 9,335,051 B2 | 5/2016 | Jarmon et al. |
| 9,546,557 B2 | 1/2017 | Grooms, III et al. |
| 9,915,159 B2 | 3/2018 | Huizenga et al. |
| 9,970,317 B2 * | 5/2018 | Freeman ................ F01D 9/042 |
| 10,174,619 B2 | 1/2019 | Uskert et al. |
| 10,174,627 B2 | 1/2019 | Chang et al. |
| 2008/0053107 A1 | 3/2008 | Weaver et al. |
| 2014/0234118 A1 | 8/2014 | Beaujard et al. |
| 2014/0255174 A1 | 9/2014 | Duelm et al. |

(Continued)

*Primary Examiner* — Ninh H. Nguyen
(74) *Attorney, Agent, or Firm* — Barnes & Thornburg LLP (57) ABSTRACT

A turbine vane assembly adapted for use in a gas turbine engine includes a turbine vane and a spar support. The turbine vane comprises ceramic matrix composite materials and is shaped to include an airfoil configured to direct the flow of hot gases through a primary gas path of the turbine vane assembly. The spar support comprises metallic materials and is configured to support other components of the turbine vane assembly relative to an associated turbine case.

20 Claims, 6 Drawing Sheets

(56) References Cited

U.S. PATENT DOCUMENTS

| | | |
|---|---|---|
| 2016/0123163 A1 | 5/2016 | Freeman et al. |
| 2016/0123164 A1 | 5/2016 | Freeman et al. |
| 2016/0177761 A1 | 6/2016 | Huizenga et al. |
| 2016/0201488 A1 | 7/2016 | Carr et al. |
| 2016/0290147 A1 | 10/2016 | Weaver |
| 2017/0022833 A1 | 1/2017 | Heitman et al. |
| 2017/0051619 A1 | 2/2017 | Tuertscher |
| 2017/0298748 A1 | 10/2017 | Vetters et al. |
| 2018/0045117 A1 | 2/2018 | Groves, II et al. |
| 2018/0223680 A1 | 8/2018 | Hafner |
| 2018/0328187 A1 | 11/2018 | Oke |
| 2018/0340431 A1 | 11/2018 | Kerns et al. |
| 2018/0370158 A1 | 12/2018 | Gallier et al. |

\* cited by examiner

TURBINE VANE ASSEMBLY HAVING CERAMIC MATRIX COMPOSITE COMPONENTS WITH EXPANDABLE SPAR SUPPORT

FIELD OF THE DISCLOSURE

The present disclosure relates generally to vane assemblies for gas turbine engines, and more specifically to vane assemblies that comprise ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine vane assembly adapted for use in a gas turbine engine may include a turbine vane and a spar support. The turbine vane may comprise ceramic matrix composite materials and be adapted for use in high temperature environments. The spar support may comprise metallic materials and extend radially through a passageway formed through the turbine vane to support the turbine vane in a desired location relative to other components within the gas turbine engine.

In some embodiments, the turbine vane may be formed to include an airfoil, an outer vane mount, and an inner vane mount. The airfoil may be shaped to interact with hot gases moving through a primary gas path of the gas turbine engine. The outer vane mount may be arranged radially outward of the primary gas path relative to a central reference axis of the gas turbine engine. The inner vane mount may be arranged radially inward of the primary gas path relative to the central reference axis of the gas turbine engine.

In some embodiments, the spar support may include an outer support member and an inner support member. The outer support member may be fixed to the outer vane mount so as to receive loads from the outer vane mount. The inner support member may be fixed to the inner vane mount so as to receive loads from the inner vane mount.

In some embodiments, the inner support member may be coupled to the outer support member to slide relative to the outer support member in a radial direction toward and away from the central reference axis so as to change the effective radial length of the spar support. The sliding of the inner support member relative to the outer support member may accommodate different rates of thermal expansion experienced by the ceramic matrix composite materials of the turbine vane and the metallic materials of the spar support during use in the gas turbine engine.

In some embodiments, the outer support member may be shaped to define a spar-receiving channel. The spar-receiving channel may extend radially at least partway through the outer support member and receive a portion of the inner support member to slidably couple the outer support member and the inner support member.

In some embodiments, the spar-receiving channel may be sized to allow a gap. The gap may be between an inner surface of the outer support member that defines the spar-receiving channel and an outer surface of the portion of the inner support member received in the spar-receiving channel.

In some embodiments, the turbine vane assembly may further include a low-friction coating. The low-friction coating may be applied to one of the inner surface of the outer support member and the outer surface of the inner support member. The low-friction coating may have a coefficient of friction lower than that of the outer support member and the inner support member to encourage sliding between the outer support member and the inner support member.

In some embodiments, the outer support member may include an outer mount panel and an outer rod. The outer mount panel may be arranged radially outward of the outer vane mount of the turbine vane. The outer rod may extend radially inward from the outer mount panel into the passageway of the turbine vane.

In some embodiments, the inner support member may include an inner mount panel and an inner rod. The inner mount panel may be arranged radially inward of the inner vane mount of the turbine vane. The inner rod may extend radially outward from the inner mount panel into the spar-receiving channel formed in the outer support member.

In some embodiments, the spar-receiving channel may extend radially through the entire length of the outer support member. The inner rod of the inner support member received in the spar-receiving channel may extend radially outward past the outer mount panel and into an outer mount extension included in the outer support member. The outer mount extension may extend radially outward from the outer mount panel and surround the inner rod.

In some embodiments, the outer support member may include an outer mount panel, an outer retainer collar, and an outer rod. The outer mount panel may be arranged radially outward of the outer vane mount of the turbine vane. The outer retainer collar may extend radially inward from the outer mount panel and couple to the outer vane mount of the turbine vane. The outer rod may extend radially inward from the outer mount panel into the passageway of the turbine vane and define a spar-receiving channel.

In some embodiments, the inner support member may include an inner mount panel, an inner retainer collar, and an inner rod. The inner mount panel may be arranged radially inward of the inner vane mount of the turbine vane. The inner retainer collar may extend radially outward from the inner mount panel and couple to the inner vane mount of the turbine vane. The inner rod may extend radially outward from the inner mount panel into the spar-receiving channel formed in the outer rod of the outer support member.

In some embodiments, the turbine vane assembly may further include load transfer pins. The load transfer pins may couple the turbine vane to the outer support member and the inner support member of the spar support at the radially-outer end and the radially-inner end of the turbine vane.

In some embodiments, the load transfer pins may include an outer mount pin and inner mount pin. The outer mount pin may extend into the outer retainer collar through an outer aperture in the outer vane mount of the turbine vane to transfer loads at the radially-outer end of the turbine vane to the outer support member. The inner mount pin may extend into the inner retainer collar through an inner aperture in the inner vane mount of the turbine vane to transfer loads at the radially-inner end of the turbine vane to the inner support member.

In some embodiments, the outer support member may be configured to be coupled to a turbine case to support the turbine vane assembly relative to the turbine case. In some embodiments, a sliding interface between the inner support member and the outer support member is configured such that substantially all radial loading applied to the turbine vane during use in the gas turbine engine is transmitted through the outer support member to the turbine case bypassing the inner support member. In some embodiments, the sliding interface between the inner support member and the outer support member may be configured such that circumferential and axial loads applied to the turbine vane during use in the gas turbine engine are transmitted through both the inner support member and the outer support member before being passed to the turbine case.

According to another aspect of the present disclosure, a turbine vane assembly adapted to be mounted around a central reference axis may include a turbine vane and a spar support. The spar support may extend radially through a passageway formed through the turbine vane.

In some embodiments, the turbine vane may include an airfoil, an outer vane mount, and an inner vane mount. The airfoil may be shaped to interact with hot gases. The outer vane mount may be arranged radially outward of the airfoil. The inner vane mount may be arranged radially inward of the airfoil.

In some embodiments, the spar support may include an outer support member and an inner support member. The outer support member may be fixed to the outer vane mount. The inner support member may be fixed to the inner vane mount. The inner support member may be coupled to the outer support member to slide relative to the outer support member in a radial direction toward and away from the central reference axis.

In some embodiments, the outer support member includes an outer mount panel and an outer rod. The outer mount panel may be arranged radially outward of the outer vane mount of the turbine vane. The outer rod may extend radially inward from the outer mount panel into the passageway of the turbine vane.

In some embodiments, the inner support member may include an inner mount panel and an inner rod. The inner mount panel may be arranged radially inward of the inner vane mount of the turbine vane. The inner rod may extend radially outward from the inner mount panel into a spar-receiving channel formed in the outer support member that extends radially at least partway through the outer support member to slidably couple the outer support member and the inner support member.

In some embodiments, the outer rod of the outer support member may be airfoil shaped in cross section when viewed in the radial direction relative to the central axis. In some embodiments, the inner rod of the inner support member may be airfoil shaped in cross section when viewed in the radial direction relative to the central axis. The inner support member may be shaped to include a cooling cavity that extends radially through the inner support member.

In some embodiments, the inner rod may be circular in cross section when viewed in the radial direction relative to the central axis. The inner support member may be shaped to include a cooling cavity that extends radially through the inner support member.

In some embodiments, the outer support member may be shaped to define an impingement channel. The impingement channel may be spaced axially forward of the spar-receiving channel toward a leading edge of the airfoil. The impingement cooling channel may extend radially through the outer support member.

In some embodiments, the outer rod may be shaped to include impingement cooling holes. The impingement cooling holes may be arranged to discharge cooling air from the impingement channel toward the leading edge of the airfoil included in the turbine vane to provide some cooling to an inner surface of the turbine vane that defines the passageway.

According to another aspect of the present disclosure, a turbine section assembly adapted for use in a gas turbine engine may include a turbine case, a turbine vane, and a spar support. The turbine case may extend around a central reference axis. The turbine vane may comprise ceramic matrix composite materials. The spar support may comprise metallic materials and extend from the turbine case and radially into a passageway defined within the turbine vane to support the turbine vane relative to the turbine case.

In some embodiments, the turbine vane may be formed to include an airfoil, an outer vane mount, and an inner vane mount. The airfoil may be shaped to interact with hot gases moving through a primary gas path. The outer vane mount may be arranged radially outward of the primary gas path. The inner vane mount may be arranged radially inward of the primary gas path.

In some embodiments, the spar support may include an outer support member and an inner support member. The outer support member may be fixed to the outer vane mount. The inner support member may be fixed to the inner vane mount. The inner support member may be coupled to the outer support member to slide relative to the outer support member in a radial direction toward and away from the central reference axis.

In some embodiments, the outer support member may be shaped to define a spar-receiving channel. The spar-receiving channel may extend radially at least partway through the outer support member and receive a portion of the inner support member to slidably couple the outer support member and the inner support member, and In some embodiments, the outer support member may include an outer mount panel and an outer rod. The outer mount panel may be arranged radially outward of the outer vane mount of the turbine vane and couple to the turbine case to support the turbine vane assembly relative to the turbine case. The outer rod may extend radially inward from the outer mount panel into the passageway of the turbine vane.

In some embodiments, the inner support member may include an inner mount panel and an inner rod. The inner mount panel may be arranged radially inward of the inner vane mount of the turbine vane. The inner rod may extend radially outward from the inner mount panel into the spar-receiving channel.

In some embodiments, a sliding interface between the inner support member and the outer support member may be configured such that substantially all radial loading applied to the turbine vane during use in the gas turbine engine is transmitted through the outer support member to the turbine case bypassing the inner support member. In some embodiments, the sliding interface between the inner support member and the outer support member may be configured such that circumferential and axial loads applied to the turbine vane during use in the gas turbine engine are transmitted through both the inner support member and the outer support member before being passed to the turbine case.

These and other features of the present disclosure will become more apparent from the following description of the illustrative embodiments.

BRIEF DESCRIPTION OF THE DRAWINGS

FIG. 8 is a cross-section view taken of a second embodiment of a turbine vane assembly adapted for use in the gas turbine engine taken along line 2-2 showing the turbine vane assembly includes a turbine vane made from ceramic matrix composite materials and a spar support made from metallic materials that supports the turbine vane, and showing the spar support includes an outer support member that extends radially inward through a passageway of the turbine vane and an inner support member that extends radially through the entire length of the outer support member to slidably couple with the outer support member to allow relative movement between the metallic materials of the spar support that may be thermal expansion of the spar support while it is fixed to the ceramic matrix composite materials of the turbine vane;

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figures 1, 2, 3:
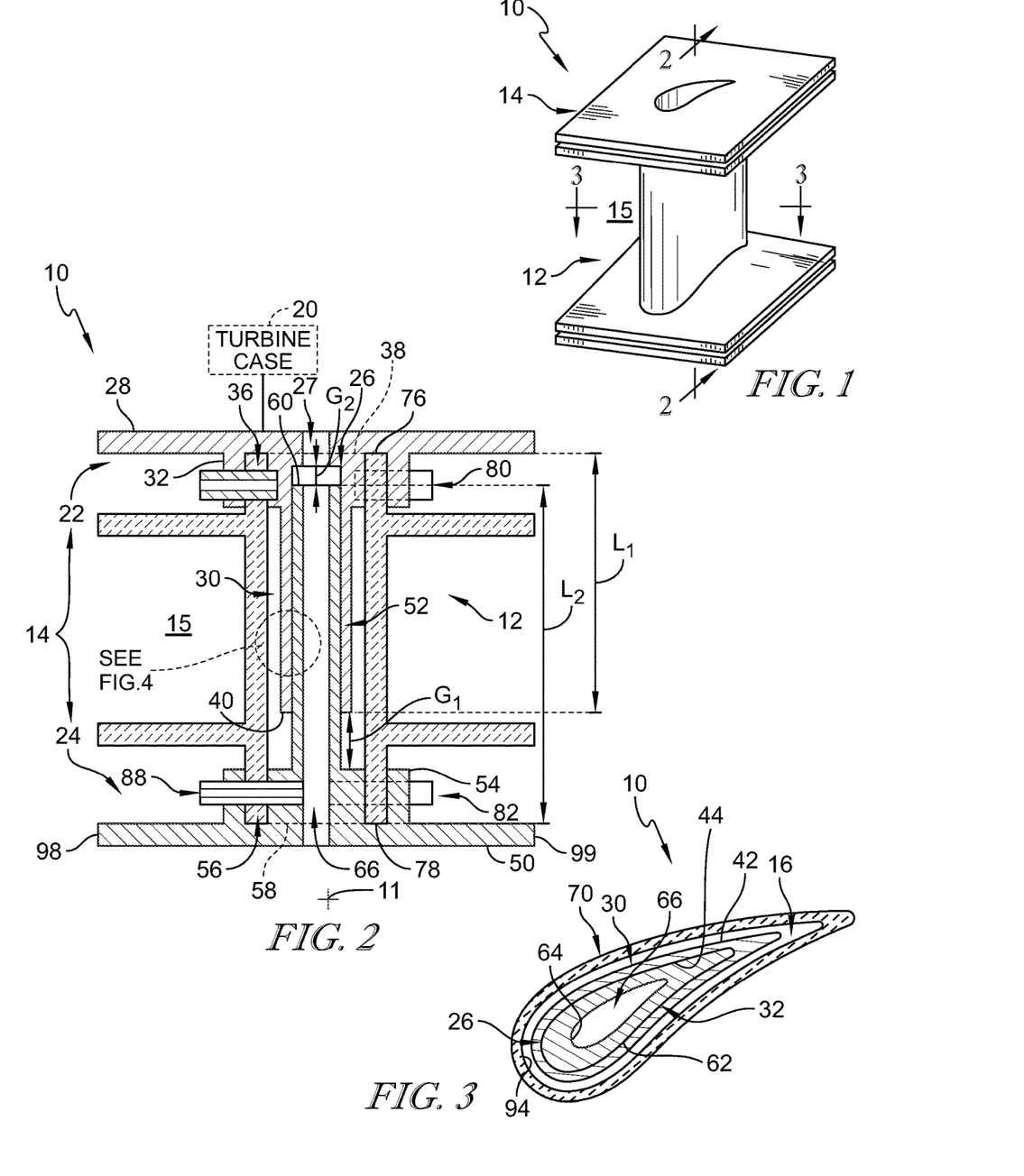
FIG. 1 is a perspective view of a turbine vane assembly adapted for use in a gas turbine engine showing the turbine vane assembly includes a turbine vane made from ceramic matrix composite materials and a spar support made from metallic materials that supports the turbine vane.
FIG. 2 is a cross-section view of the turbine vane assembly of FIG. 1 taken along line 2-2 showing the spar support includes an outer support member that extends radially inward through a passageway of the turbine vane and an inner support member that extends radially outward through the passageway of the turbine vane, and showing the inner support member slidably couples with the outer support member to allow relative movement between the metallic materials of the spar support that may be thermal expansion of the spar support while it is fixed to the ceramic matrix composite materials of the turbine vane.
FIG. 3 is a cross-section view of the turbine vane assembly of FIG. 1 taken along line 3-3 showing the inner support member is received within a spar-receiving channel formed in the outer support member for sliding movement therein.

A turbine vane assembly 10 included in a turbine section assembly according to the present disclosure is adapted for use in for a gas turbine engine as shown in FIGS. 1-6. The turbine vane assembly 10 includes a turbine vane 12 and a spar support 14 as shown in FIG. 1. The turbine vane 12 is shaped to interact with hot gases moving through a primary gas path 15 of the gas turbine engine. The spar support 14 extends radially through a passageway 16 formed in the turbine vane 12 to support the turbine vane 12 in a desired location relative to other components, such as a turbine case 20, within the turbine section assembly of the gas turbine engine.

The turbine vane 12 comprises ceramic matrix composite materials, while the spar 14 comprises metallic materials. The ceramic matrix composite vane 12 is adapted to withstand high temperatures, but may have a relatively low strength compared the metallic spar 14. The spar 14 is therefore configured to support other components of the turbine vane assembly 10, like the ceramic matrix composite turbine vane 12 or an inter-stage seal, relative to the associated turbine case 20 and carry loads from the other components to the turbine case 20.

Figures 4, 5:
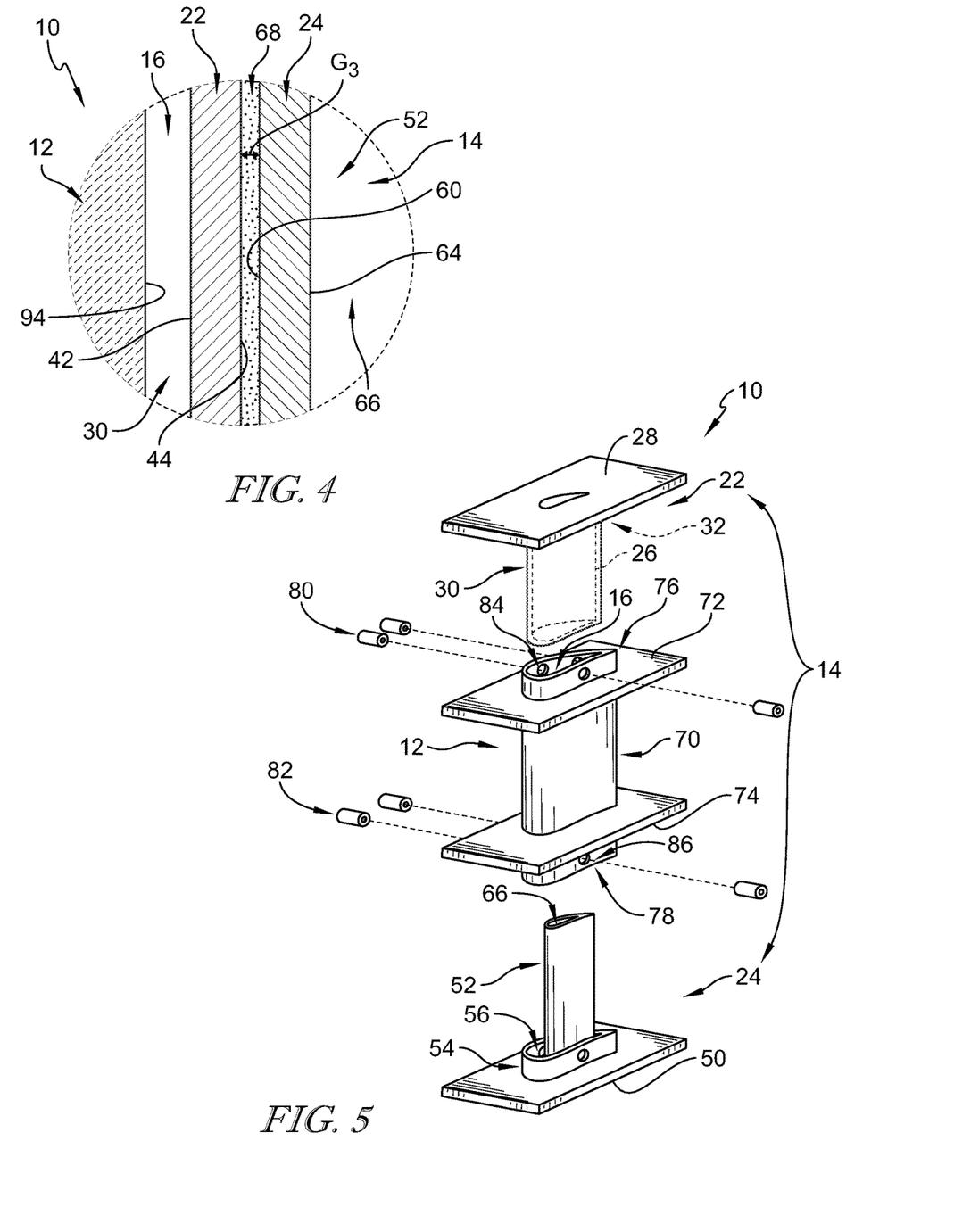
FIG. 4 is cross-section view similar to FIG. 2 showing the turbine vane assembly further includes a low-friction coating applied to one (or both) of an inner surface of the outer support member and the outer surface of the inner support member to encourage sliding between the outer and inner support members.
FIG. 5 is an exploded view of the turbine vane assembly of FIG. 1 showing the turbine vane assembly further includes load transfer pins that couple the turbine vane to the spar support and extend through vane mounts of the turbine vane at both radially inner and outer ends of the vane into an outer retainer collar of the outer support member and an inner retainer collar of the inner support member to transfer loads from the vane to the spar support.

Ceramic matrix composite materials of the turbine vane 12 and metallic materials of the spar 14 grow and shrink at different rates when exposed to high/low temperatures. More specifically, metallic materials have coefficients of thermal expansion much higher than those of ceramic matrix composites. To accommodate this difference, the spar support 14 includes an outer support member 22 and an inner support member 24 as shown in FIGS. 2-4. The outer and inner support members 22, 24 are fixed relative to the turbine vane 12 to transfer aerodynamic loads of the vane 12, while the inner support member 24 is coupled to the outer support member 22 to slide relative to the outer support member 22 in a radial direction toward and away from a central reference axis 11 of the gas turbine engine. The sliding of the inner support member 24 relative to the outer support member 22 changes the effective radial length of the spar support 14 and accommodates different rates of thermal expansion experienced by the ceramic matrix composite materials of the turbine vane 12 and the metallic materials of the spar support 14 during use in the gas turbine engine.

In the illustrative embodiment, the outer support member 22 is shaped to define a spar-receiving channel 26 that extends radially at least partway through the outer support member 22. The spar-receiving channel 26 receives a portion of the inner support member 24 to form a sliding interface between the outer support member 22 and the inner support member 24 to slidably couple the outer support member 22 and inner support member 24.

The sliding interface between the inner support member 24 and the outer support member 22 is configured such that substantially all radial loading applied to the turbine vane 12 during use in the gas turbine engine is transmitted through the outer support member 22 to the turbine case 20 bypassing the inner support member 24. The sliding interface between the inner support member 24 and the outer support member 22 is configured such that circumferential and axial loads applied to the turbine vane 12 during use in the gas turbine engine are transmitted through both the inner support member 24 and the outer support member 22 before being passed to the turbine case 20. The spar support 14 may also be configured to transmit axial loads from the inter-stage seal located radially inward of the turbine vane 12 to the turbine case 20.

The outer support member 22 includes an outer mount panel 28, an outer rod 30, and an outer retainer collar 32 as shown in FIGS. 2-5. The outer mount panel 28 is arranged radially outward of a radially-outer end of the turbine vane 12 and couples to the turbine case 20 to support the turbine vane assembly 10 relative to the turbine case 20. The outer rod 30 extends radially inward from the outer mount panel 28 into the passageway 16 of the turbine vane 12. The outer retainer collar 32 extends radially inward from the outer mount panel 28 and couples to the radially-outer end of the turbine vane 12. In the illustrative embodiment, the outer retainer collar 32 is shaped to define an outer cavity 36 between the outer rod 30 and the outer retainer collar 32 that receives the radially-outer end of the turbine vane 12.

The outer rod 30 includes a radially-outer end 38, a radially-inner end 40, an outer surface 42, and an inner surface 44 shown in FIGS. 2-4. The radially-outer end 38 interfaces the outer mount panel 28. The radially-inner end 40 is arranged radially inward of the radially-outer end 38 to define a radial length L1 of the outer rod 30. The outer surface 42 extends between and interconnects the radially-outer end 38 and the radially-inner end 40 and faces an innermost surface 94 of the turbine vane 12 defining the passageway 16. The inner surface 44 is arranged opposite the outer surface 42 and defines the spar-receiving channel 26.

In the illustrative embodiment, the length L1 of the outer rod 30 is sized so that the radially-inner end 40 of the outer rod 30 is spaced apart from the inner support member 24 to define a clearance gap G1 therebetween. The clearance gap G1 allows the outer support member 22 to thermally expand without the radially-inner end 40 of the outer rod 30 engaging the inner support member 24 and overstressing the ceramic matrix composite materials of the vane 12.

In the illustrative embodiment, the outer rod 30 is airfoil shaped in cross section when viewed in the radial direction relative to the central axis 11. In other embodiments, the outer rod 30 may have a different cross-sectional shape.

The inner support member 24 includes an inner mount panel 50, an inner rod 52, and an inner retainer collar 54 as shown in FIGS. 2-5. The inner mount panel 50 is arranged radially inward of the radially-inner end of the turbine vane 12. The inner rod 52 extends radially outward from the inner mount panel 50 into the spar-receiving channel 26 formed in the outer rod 30 of the outer support member 22. The inner retainer collar 54 extends radially outward from the inner mount panel 50 and couples to the radially-inner end of the turbine vane 12. In the illustrative embodiment, the inner retainer collar 54 is shaped to define an inner cavity 56 between the inner rod 52 and the inner retainer collar 54 that receives the radially-inner end of the turbine vane 12.

The inner rod 52 includes a radially-inner end 58, a radially-outer end 60, an outer surface 62, and an inner surface 64 as shown in FIGS. 2-4. The radially-inner end 58 interfaces the inner mount panel 50. The radially-outer end 60 is arranged radially outward of the radially-inner end 58 to define a radial length L2 of the inner rod 52. The outer surface 62 extends between and interconnects the radially-inner end 58 and the radially-outer end 60 of the inner rod 52 and faces the inner surface 44 of the outer rod 30 defining the spar-receiving channel 26. The inner surface 64 of the inner rod 52 defines a portion of an inner cooling channel 66 that extends radially through the spar support 14.

In the illustrative embodiment, the outer support member 22 is also shaped to include an outer cooling channel 27 as shown in FIG. 2. The outer cooling channel 27 extends radially through the outer mount panel 28 and opens into the spar-receiving channel 26. The outer cooling channel 27 is arranged to extend radially through the outer mount panel 28 such that the outer cooling channel 27 aligns with the inner cooling channel 66 of the inner support member 24.

In the illustrative embodiment, the length L2 of the inner rod 52 is sized so that the radially-outer end 60 of the inner rod 52 is spaced apart from the radially-outer end 38 of the outer rod 30 to define an expansion gap G2 therebetween. The expansion gap G2 allows the inner support member 24 to thermally expand within the spar-receiving channel 26 without engaging the outer support member 22. Therefore, the expansion gap G2 is sized to be at least the magnitude of the relative thermal expansion between the ceramic matrix composite materials of the turbine vane 12 and the metallic materials of the spar support 14 so that the ceramic matrix composite vane 12 is not overstressed at the fixed locations at the radially inner and outer ends of the vane 12.

In the illustrative embodiment, the inner rod 52 is airfoil shaped when viewed in the radially direction relative to the central axis 11. In other embodiments, the inner rod 52 may have a different cross-sectional shape.

The spar-receiving channel 26 is sized to allow a gap G3 between the inner surface 44 of the outer rod 30 and the outer surface 62 of inner rod 52 received in the spar-receiving channel 26 as shown in FIG. 4. The gap G3 is configured to allow the sliding of the inner support member 24 relative to the outer support member 22 in the radial direction.

In the illustrative embodiments, the support member 14 further includes a low-friction coating 68 as shown in FIG. 4. The low-friction coating 68 is applied to one of the inner surface 44 of the outer support member 22 and the outer surface 62 of the inner support member 24. The low-friction coating 68 has a coefficient of friction lower than that of the outer support member 22 and the inner support member 24 to encourage sliding between the outer support member 22 and the inner support member 24. In some embodiments, the low-friction coating 68 is applied to the inner surface 44 of the outer rod 30. In other embodiments, the low-friction coating 68 is applied to the outer surface 62 of the inner rod 52.

Turning again to the turbine vane 12, the turbine vane 12 includes an airfoil 70, outer and inner panels 72, 74, and outer and inner vane mounts 76, 78 as shown in FIGS. 2 and 5. The airfoil 70 shaped to interact with hot gases moving through the primary gas path 15 of the gas turbine engine. The outer and inner panels 72, 74 each extend circumferentially from the airfoil 70 away from the passageway 16 through the turbine vane 14 to define the primary gas path 15 across the turbine vane assembly 10. The outer panel 72 is arranged radially inward of the outer vane mount 76 and the inner panel 74 is arranged radially outward of the inner vane mount 78. The outer and inner vane mounts 76, 78 are each arranged radially outward/inward of the primary gas path 15 relative to the central reference axis 11 of the gas turbine engine and define the radially-outer and radially inner ends of the turbine vane 12.

In the illustrative embodiment, the turbine vane 14 is a one-piece component. The airfoil 70, the outer vane mount 76, the inner vane mount 78, the outer panel 72, and the inner panel 74 are integrated into a single piece of ceramic matrix composite material that has been co-infiltrated with ceramic matrix material. In other embodiments, the airfoil 70, the panels 72, 74, and the vane mounts 76, 78 are formed as separate components.

In the illustrative embodiment, the outer retainer collar 32 of the outer support member 22 is fixed to the outer vane mount 76 so as to receive loads from the outer vane mount 76. The outer cavity 36 receives the outer vane mount 76 so that the outer retainer collar 32 is spaced away from the outer panel 72 of the turbine vane 12.

Additionally, the inner retainer collar 54 of the inner support member 24 is fixed to the inner vane mount 78 so as to receive loads from the inner vane mount 78. The inner cavity 56 receives the inner vane mount 78 so that the inner retainer collar 54 is spaced away from the inner panel 74 of the turbine vane 12.

In the illustrative embodiment, the turbine vane assembly 10 further includes load transfer pins 80, 82 as shown in FIGS. 2 and 5. The load transfer pins 80, 82 couple the turbine vane 12 to the outer support member 22 and the inner support member 24 of the spar support 14 at the outer vane mount 76 and the inner vane mount 78 of the turbine vane 12. In other embodiments, the load transfer pins 80, 82 may also be used to couple the turbine vane 12 to other types of metallic support structures (inner collars, turbine case, flanges, etc.).

The load transfer pins 80 include outer mount pins 80 and inner mount pins 82 as shown in FIGS. 2 and 5. Each of the outer mount pins 80 extend into the outer retainer collar 32 through an outer aperture 84 in the outer vane mount 76 of the turbine vane 12 to transfer loads at the outer vane mount 76 of the turbine vane 12 to the outer support member 22. Each of the inner mount pins 82 extend into the inner retainer collar 54 through an inner aperture 86 in the inner vane mount 78 of the turbine vane 12 to transfer loads at the inner vane mount 78 of the turbine vane 12 to the inner support member 24. In the illustrative embodiment, the inner and outer apertures 84, 86 are sized to block radial movement of the corresponding outer and inner mount pins 80, 82 as to fix the outer support member 22 and the inner support member 24 in place radially relative to the turbine vane 12.

In the illustrative embodiment, the outer vane mount 76 and the inner vane mount 78 each include only three apertures 84, 86 and three corresponding load transfer pins 80, 82. In other embodiments, the mounts 76, 78 may each include more than three apertures 84, 86. In other embodiments, the outer vane mount 76 may include a different number of apertures 84 than the inner vane mount 78 and vice versa.

In the illustrative embodiment, the load transfer pins 80, 82 are made from metallic materials and are mechanically fastened or joined to the metallic spar 14. In other embodiments, the load transfer pins 80, 82 may be made of non-metallic materials to better match the ceramic matrix composite materials coefficient of thermal expansion and improve chemically compatibility.

Each of the load transfer pins 80, 82 includes a through hole 88 as shown in FIG. 2. The through hole 88 extends through the length of the pin 80, 82. In the illustrative embodiment, the through hole 88 of the inner load transfer pins 82 opens into the cooling channel 66 of the spar support 14.

In some embodiments, the through holes 88 may be used to supply cooling air to the cooling channel 66 of the spar support 14 and transit flow to feed other cavities with the cooling air. In other embodiments, the through holes 88 of the pins 80, 82 may be used to cool the pins 80, 82 and reduce the temperature of the contact between the ceramic vane 12 and the load transfer pins 80, 82.

Figure 6:
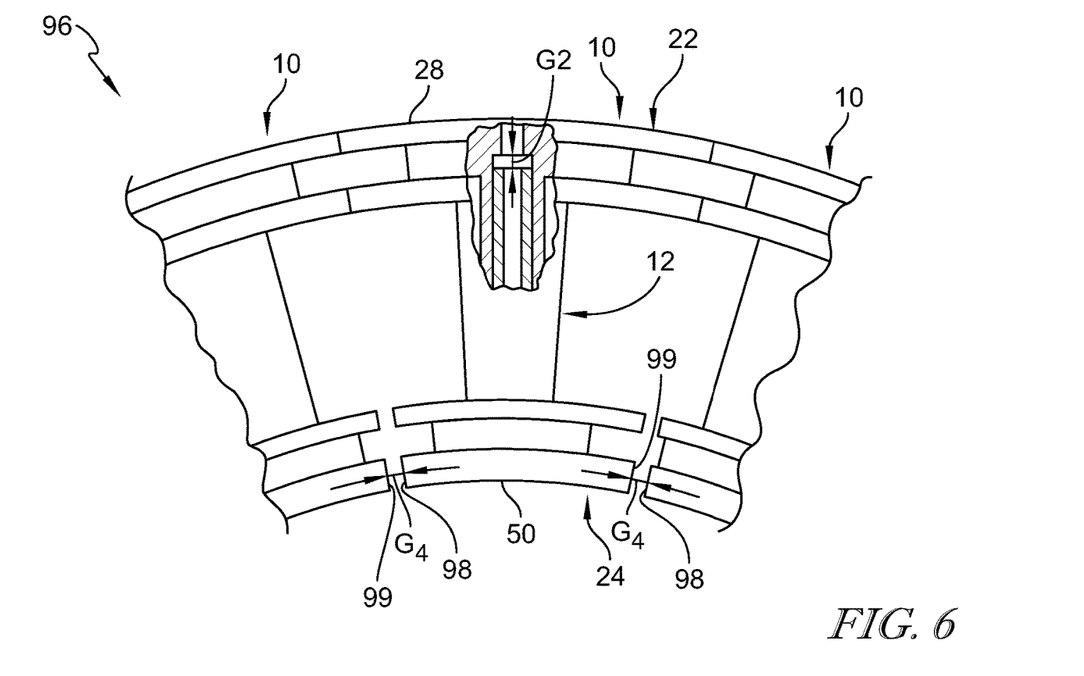
FIG. 6 is a frontal view of a plurality of the turbine vane assemblies arranged around the central axis to form a vane ring assembly showing that adjacent turbine vane assemblies are arranged such that circumferential gaps are formed between circumferential faces of adjacent inner support elements of the turbine vane assemblies.

In the illustrative embodiments, the turbine section assembly includes a plurality of turbine vane assemblies 10 arranged around the central axis 11 to form a vane ring assembly 96. At cold build, as shown in FIG. 6, the turbine vane assemblies 12 are arranged around the center axis 11 adjacent to one another such that circumferential gaps G4 are formed between circumferential faces 98, 99 of adjacent inner support elements 24. The circumferential gaps G4 provide a tolerance or clearance for inboard loading of the inner support elements 24.

Figure 7:
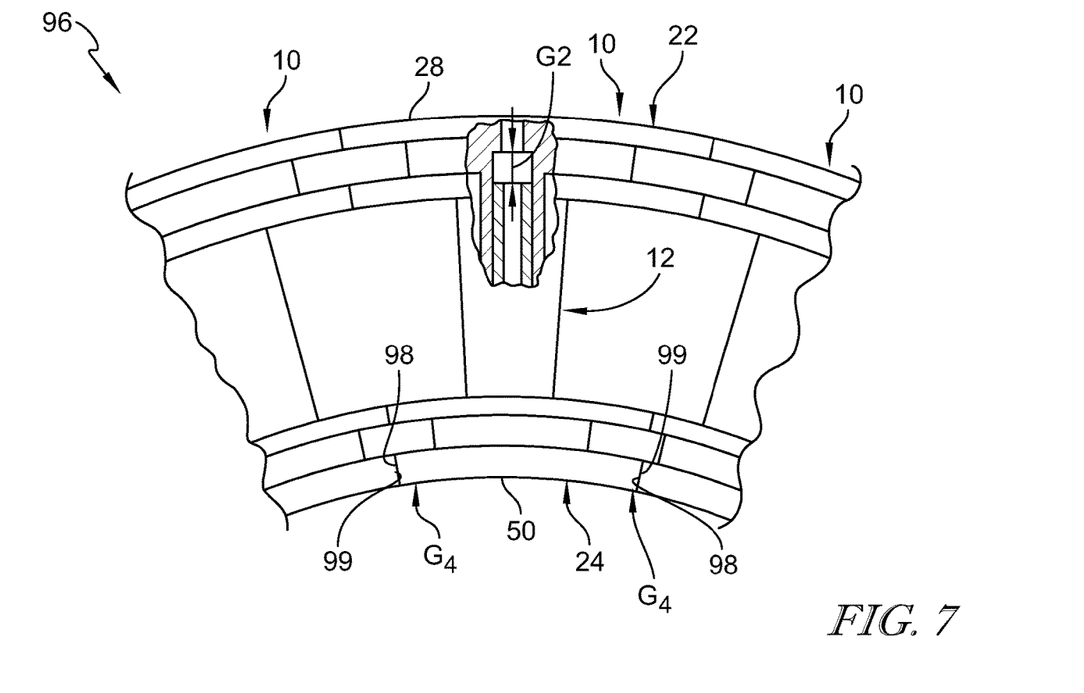
FIG. 7 is a frontal view of the plurality of turbine vane assemblies similar to FIG. 6 showing that the circumferential gaps between the adjacent turbine vane assemblies are concentrically reduced such that the circumferential faces of adjacent inner support elements contact one another to react and balance inboard loading of the turbine vane.

The radial loading applied to the turbine vane 12 concentrically reduces the circumferential gaps G4 as shown in FIG. 7. The circumferential gaps G4 are reduced so that the circumferential faces 98, 99 contact one another to react and balance the radial inboard loading of the turbine vane 12. In this way, the radial loading remains transmitted through the outer support element 22.

The expansion gap G2 increases as the circumferential gaps G4 are reduced. The expansion gap G2 increases due to the radial sliding of the inner support element 24 relative to the outer support element 22 which is fixed to the turbine case 20. The gaps G1, G2, G4 may also be sized considering adverse tolerances.

Figures 8, 9, 10:
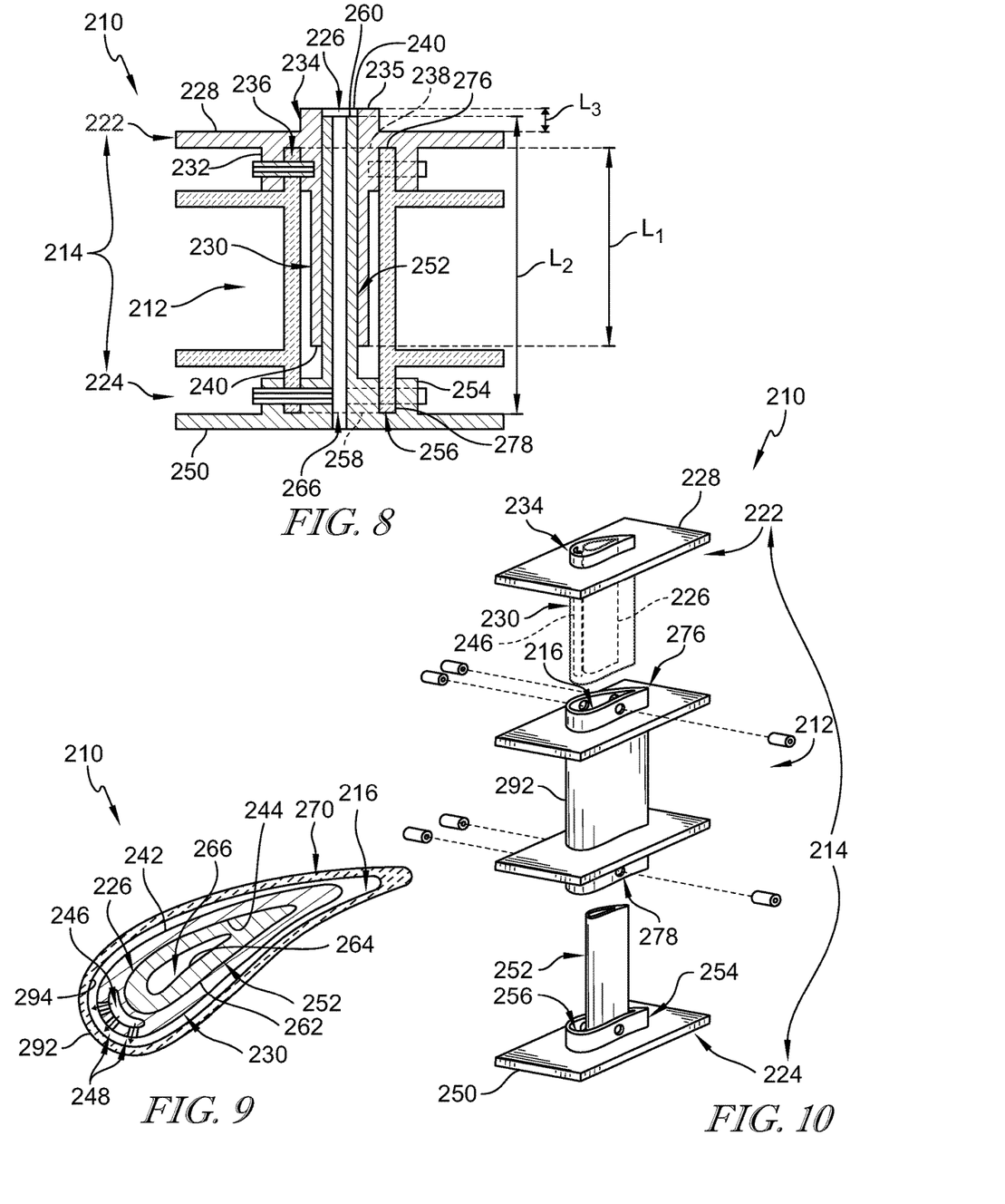
FIG. 9 is cross-section view of the turbine vane assembly of FIG. 8 taken along line 3-3 showing the outer support member includes a spar-receiver passageway that receives the inner support member for sliding movement therein and an impingement passageway that extends radially through the outer support member near a leading edge of the turbine vane and is configured to transmit a flow of cooling air onto an inner surface of the turbine vane.
FIG. 10 is an exploded view of the turbine vane assembly of FIG. 8 showing the turbine vane assembly further includes load transfer pins that couple the turbine vane to the spar support and extend through vane mounts of the turbine vane at both radially inner and outer ends of the vane and into an outer retainer collar of the outer support member and an inner retainer collar of the inner support member to transfer loads from the vane to the spar support.

Another embodiment of a turbine vane assembly 210 in accordance with the present disclosure is shown in FIGS. 8-10. The turbine vane assembly 210 is substantially similar to the turbine vane assembly 10 shown in FIGS. 1-6 and described herein. Accordingly, similar reference numbers in the 200 series indicate features that are common between the turbine vane assembly 10 and the turbine vane assembly 210. The description of the turbine vane assembly 10 is incorporated by reference to apply to the turbine vane assembly 210, except in instances when it conflicts with the specific description and the drawings of the turbine vane assembly 210.

The turbine vane assembly 210 includes a turbine vane 212 and a spar support 214 as shown in FIG. 8. The turbine vane 212 is shaped to interact with hot gases moving through the primary gas path 15 of the gas turbine engine. The spar 214 extends radially through a passageway 216 formed in the turbine vane 212 to support the turbine vane 212 in a desired location relative to other components, such as the turbine case 20, within the gas turbine engine.

The spar support 214 includes an outer support member 222 and an inner support member 224 as shown in FIGS. 8-10. The outer support member 22 and the inner support member 224 accommodate the difference in coefficients of thermal expansion between the ceramic matrix composite vane 212 and the spar support 214. The outer and inner support members 222, 224 are fixed relative to the turbine vane 212 to transfer aerodynamic loads of the vane 212, while the inner support member 24 is coupled to the outer support member 22 to slide relative to the outer support member 22 in a radial direction toward and away from the central reference axis 11.

The outer support member 222 includes an outer mount panel 228, an outer rod 230, an outer retainer collar 232, and an outer extension 234 as shown in FIGS. 8-10. The outer mount panel 228 is arranged radially outward of an outer vane mount 276 of the turbine vane 212. The outer rod 230 extends radially inward from the outer mount panel 228 into the passageway 216 of the turbine vane 212. The outer retainer collar 232 extends radially inward from the outer mount panel 228 and couples to the outer vane mount 276 the turbine vane 212. The outer mount extension 234 extends radially outward from the outer mount panel 228 and couples to the turbine case 20 to support the turbine vane 212 relative to the turbine case 20.

The outer support member 222 is shaped to define a spar-receiving channel 226 that extends radially through the entire length of the outer support member 222. The spar-receiving channel 226 receives a portion of the inner support member 224 to slidably couple the outer support member 222 and the inner support member 224. In the illustrative embodiment, the spar-receiving channel 226 extends radially through the outer mount panel 228, the outer rod 230, the outer retainer collar 232, and the outer extension 234.

The outer rod 230 includes a radially-outer end 238, a radially-inner end 240, an outer surface 242 shown in FIGS. 8 and 9. The radially-outer end 238 interfaces the outer mount panel 228. The radially-inner end 240 is arranged radially inward of the radially-outer end 238 to define a radial length L1 of the outer rod 230. The outer surface 242 extends between and interconnects the radially-outer end 238 and the radially-inner end 240 and faces an innermost surface 294 of the turbine vane 212 defining the passageway 216.

In the illustrative embodiment, the outer retainer collar 232 is shaped to define an outer cavity 236. The outer cavity 236 is arranged between the outer rod 230 and the outer retainer collar 232 and receives the radially-outer end of the turbine vane 212.

In the illustrative embodiment, the outer extension 234 includes an outer end 235 and an inner interface 237 as shown in FIG. 8. The inner interfaces 237 interfaces the outer mount panel 228. The outer end is spaced radially outward from the inner interface 237 to define a length L3 of the outer extension 234. The entire length of the outer support member 222 is defined by the outer end 235 of the outer mount extension 234 and the radially-inner end 240 of the outer rod 230 in the illustrative embodiment.

The spar-receiving channel 226 is defined by an inner surface 244 that extends between the outer end 235 of the outer extension 234 to the radially-inner end 240 of the outer rod 230. The spar-receiving channel 226 extends radially through the entire length of the outer support member 224 to allow the radial length L2 of the inner support member 224 to extend radially outward past the outer mount panel 228.

In the illustrative embodiment, the outer support member 222 is also shaped to define an impingement channel 246 and impingement cooling holes 248 as shown in FIGS. 9 and 10. The impingement channel 246 is spaced axially forward of the spar-receiving channel 226 toward a leading edge 292 of the turbine vane 212 and extends radially through the entire length of the outer support member 222. The outer rod 230 of the outer support member 222 is shaped to include the impingement cooling holes 248 that are arranged to discharge cooling air from the impingement channel 246 toward the leading edge 292 of the turbine vane 212 to provide some cooling to an inner surface 294 of the turbine vane 212 that defines the passageway 216.

The inner support member 224 includes an inner mount panel 250, an inner rod 252, and an inner retainer collar 254 as shown in FIGS. 8-10. The inner mount panel 250 is arranged radially inward of the radially-inner end of the turbine vane 212. The inner rod 252 extends radially outward from the inner mount panel 250 into the spar-receiving channel 226 formed in the outer support member 222. The inner retainer collar 254 extends radially outward from the inner mount panel 250 and couples to an inner vane mount 278 of the turbine vane 212.

In the illustrative embodiment, the inner retainer collar 254 is shaped to define an inner cavity 256. The inner cavity 256 is arranged between the inner rod 252 and the inner retainer collar 254 that receives the inner vane mount 278 of the turbine vane 212.

In the illustrative embodiment, the inner rod 252 extends radially outward past the outer mount panel 228 and into the outer mount extension 234. The outer mount extension 234 surrounds the portion of the inner rod 252 that extends radially outward and past the outer mount panel 228.

The inner rod 252 includes a radially-inner end 258, a radially-outer end 260, an outer surface 262, and an inner surface 264 as shown in FIGS. 8 and 9. The radially-inner end 258 interfaces the inner mount panel 250. The radially-outer end 260 is arranged radially outward of the radially-inner end 258 to define a radial length L2 of the inner rod 252. The outer surface 262 extends between and interconnects the radially-inner end 258 and the radially-outer end 260 of the inner rod 252 and faces the inner surface 244 of the outer rod 230 defining the spar-receiving channel 226. The inner surface 264 of the inner rod 252 defines a cooling channel 266 that extends radially through the inner support member 224.

In the illustrative embodiment, the length L2 may be sized so that the radially-outer end 260 of the inner rod 252 does not extend past the outer end 235 of the outer extension 234. In other embodiments, the length L2 of the inner rod 252 is sized so that the radially-outer end 260 of the inner rod 252 extends radially outward and past the outer mount panel 228 to the outer end 235 of the outer extension 234.

Figures 11, 12, 13:
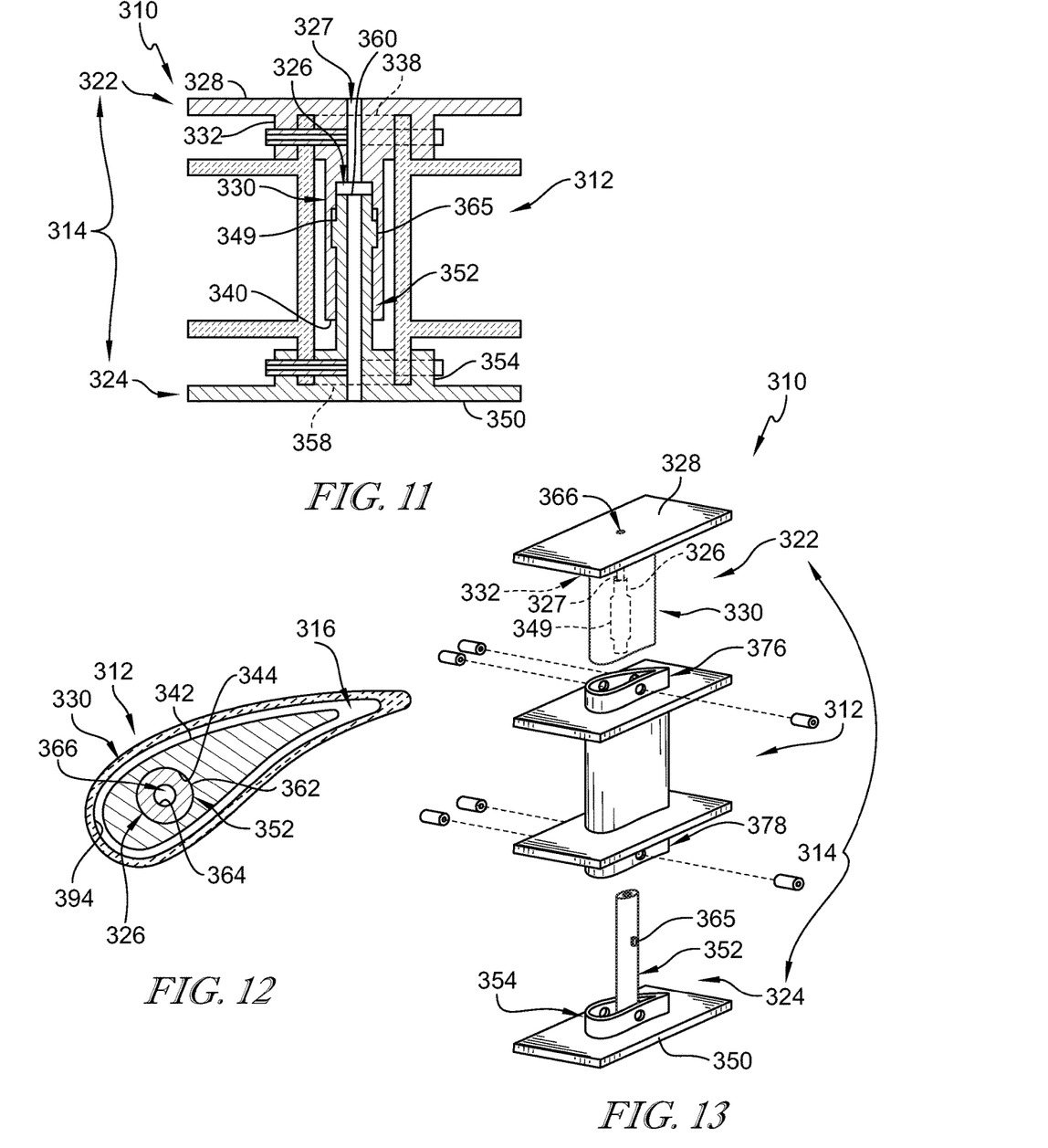
FIG. 11 is a cross-section view taken of a third embodiment of a turbine vane assembly adapted for use in the gas turbine engine taken along line 2-2 showing the turbine vane assembly includes a turbine vane and a metallic spar support that supports the turbine vane, and showing the spar support includes an outer support member that extends radially inward through a passageway of the turbine vane and an inner support member that extends radially partway into outer support member to slidably couple with the outer support member to allow relative movement between the metallic materials of the spar support that may be thermal expansion of the spar support while it is fixed to the ceramic matrix composite materials of the turbine vane.
FIG. 12 is a cross-section view of the turbine vane assembly of FIG. 11 taken along line 3-3 showing the outer support member is airfoil shaped in cross-section and includes a spar-receiving passageway that receives the inner support member that is circular in cross-section for sliding movement therein.
FIG. 13 is an exploded view of the turbine vane assembly of FIG. 11 showing the turbine vane assembly further includes load transfer pins that couple the turbine vane to the spar support and extend through vane mounts of the turbine vane at both radially inner and outer ends of the vane and into an outer retainer collar of the outer support member and an inner retainer collar of the inner support member to transfer loads from the vane to the spar support.

Another embodiment of a turbine vane assembly 310 in accordance with the present disclosure is shown in FIGS. 11-13. The turbine vane assembly 310 is substantially similar to the turbine vane assembly 10 shown in FIGS. 1-6 and described herein. Accordingly, similar reference numbers in the 310 series indicate features that are common between the turbine vane assembly 10 and the turbine vane assembly 310. The description of the turbine vane assembly 10 is incorporated by reference to apply to the turbine vane assembly 310, except in instances when it conflicts with the specific description and the drawings of the turbine vane assembly 310.

The turbine vane assembly 310 includes a turbine vane 312 and a spar support 314 as shown in FIG. 11. The turbine vane 312 is shaped to interact with hot gases moving through the primary gas path 15 of the gas turbine engine. The spar 314 extends radially through a passageway 316 formed in the turbine vane 312 to support the turbine vane 312 in a desired location relative to other components, such as the turbine case 20, within the gas turbine engine.

The spar support 314 includes an outer support member 322 and an inner support member 324 as shown in FIGS. 11-13. The outer support member 322 and the inner support member 324 accommodate the difference in coefficients of thermal expansion between the ceramic matrix composite vane 312 and the spar support 314. The outer and inner support members 322, 324 are fixed relative to the turbine vane 312 to transfer aerodynamic loads of the vane 312, while the inner support member 324 is coupled to the outer support member 322 to slide relative to the outer support member 322 in a radial direction toward and away from the central reference axis 11.

The outer support member 322 includes an outer mount panel 328, an outer rod 330, and an outer retainer collar 332 as shown in FIGS. 11-13. The outer mount panel 328 is arranged radially outward of an outer vane mount 376 of the turbine vane 312 and is coupled to the turbine case 20 to support the turbine vane assembly 312 relative to the turbine case 20. The outer rod 330 extends radially inward from the outer mount panel 328 into the passageway 316 of the turbine vane 312. The outer retainer collar 332 extends radially inward from the outer mount panel 328 and couples to the outer vane mount 376 the turbine vane 312.

The outer rod 330 of the outer support member 322 is shaped to define a spar-receiving channel 326 and an outer cooling channel 327 as shown in FIGS. 11 and 13. The spar-receiving channel 326 extends radially at least partway through the outer rod 330. The spar-receiving channel 326 receives a portion of the inner support member 324 to slidably couple the outer support member 322 and the inner support member 324. The cooling channel 327 extends radially at least partway through the outer rod 330 and the outer mount panel 328 and opens into the spar-receiving channel 326.

The outer rod 330 includes a radially-outer end 338, a radially-inner end 340, an outer surface 342, and an inner surface 344 shown in FIGS. 11 and 12. The radially-outer end 338 interfaces the outer mount panel 328. The radially-inner end 340 is arranged radially inward of the radially-outer end 338 to define the radial length L1 of the outer rod 330. The outer surface 342 extends between and interconnects the radially-outer end 338 and the radially-inner end 340 and faces an innermost surface 394 of the turbine vane 212 defining the passageway 316. The inner surface 344 is arranged opposite the outer surface 342 and defines the spar-receiving channel 326.

In the illustrative embodiment, the outer rod 330 is also shaped to include radial guide channels 349 as shown in FIGS. 11 and 13. The guide channels 349 extend from the inner surface 344 toward the outer surface 342 into the outer rod 330. The guide channels 349 are configured to receive features 365 on the inner support member 324 to limit the radial growth between the inner support member 324 and the outer support member 322.

In the illustrative embodiment, the guide channels 349 extend only partway along the radial length L1 of the rod. The guide channels are sized to be at least the magnitude of the relative thermal expansion between the ceramic matrix composite materials of the turbine vane 312 and the metallic materials of the spar support 314.

In the illustrative embodiment, the outer rod 330 is shaped to include two guide channels 349. The guide channels 349 are arranged on opposite sides of the outer rod 330. In other embodiments, the outer rod 330 may include more than two guide channels 349.

The inner support member 324 includes an inner mount panel 350, an inner rod 352, and an inner retainer collar 354 as shown in FIGS. 11-13. The inner mount panel 350 is arranged radially inward of the radially-inner end of the turbine vane 312. The inner rod 352 extends radially outward from the inner mount panel 350 into the spar-receiving channel 326 formed in the the outer support member 322. The inner retainer collar 354 extends radially outward from the inner mount panel 350 and couples to an inner vane mount 378 of the turbine vane 312.

The inner rod 352 includes a radially-inner end 358, a radially-outer end 360, an outer surface 362, and an inner surface 364 as shown in FIGS. 11 and 12. The radially-inner end 358 interfaces the inner mount panel 350. The radially-outer end 360 is arranged radially outward of the radially-inner end 58 to define the radial length L2 of the inner rod 352. The outer surface 362 extends between and interconnects the radially-inner end 358 and the radially-outer end 360 of the inner rod 352 and faces the inner surface 344 of the outer rod 330 defining the spar-receiving channel 326. The inner surface 364 defines an inner cooling channel 366 that extends radially through the inner rod 352. The inner cooling channel 366 is arranged to extend radially through the inner rod 352 such that the inner cooling channel 366 aligns with the outer cooling channel 327 of the outer rod 330.

The inner rod 352 is also shaped to include radial stops 365 as shown in FIGS. 11 and 13. The radial stops 365 extend from the outer surface 262 of the inner rod 352 and into the guide channels 349 of the outer rod 330. The radial stops 365 are configured to limit the radial growth of the inner support member 324 relative to the outer support member 322.

In the illustrative embodiment, the outer rod 330 is airfoil shaped in cross section when viewed in the radial direction relative to the central axis 11, while the inner rod 352 is circular in cross section when viewed in the radially direction relative to the central axis 11. The spar-receiving channel 326 is cylindrical in shape to mate with the cylindrical shape of the inner rod 352.

In some embodiments, the inner rod 352 may further include an anti-rotation feature. The anti-rotation feature is configured to block rotation of the inner rod 352 relative to the outer support element 322 within the spar-receiving channel 326. In some embodiments, the radial stops 365 may be configured to block rotation of the inner rod 352 within the spar-receving channel 326. In other embodiments, the outer rod 330 may include the anti-rotation feature to block rotation of the inner support element 324 within the spar-receiving channel 326 relative to the outer support element 322.

Figures 14, 15, 16:
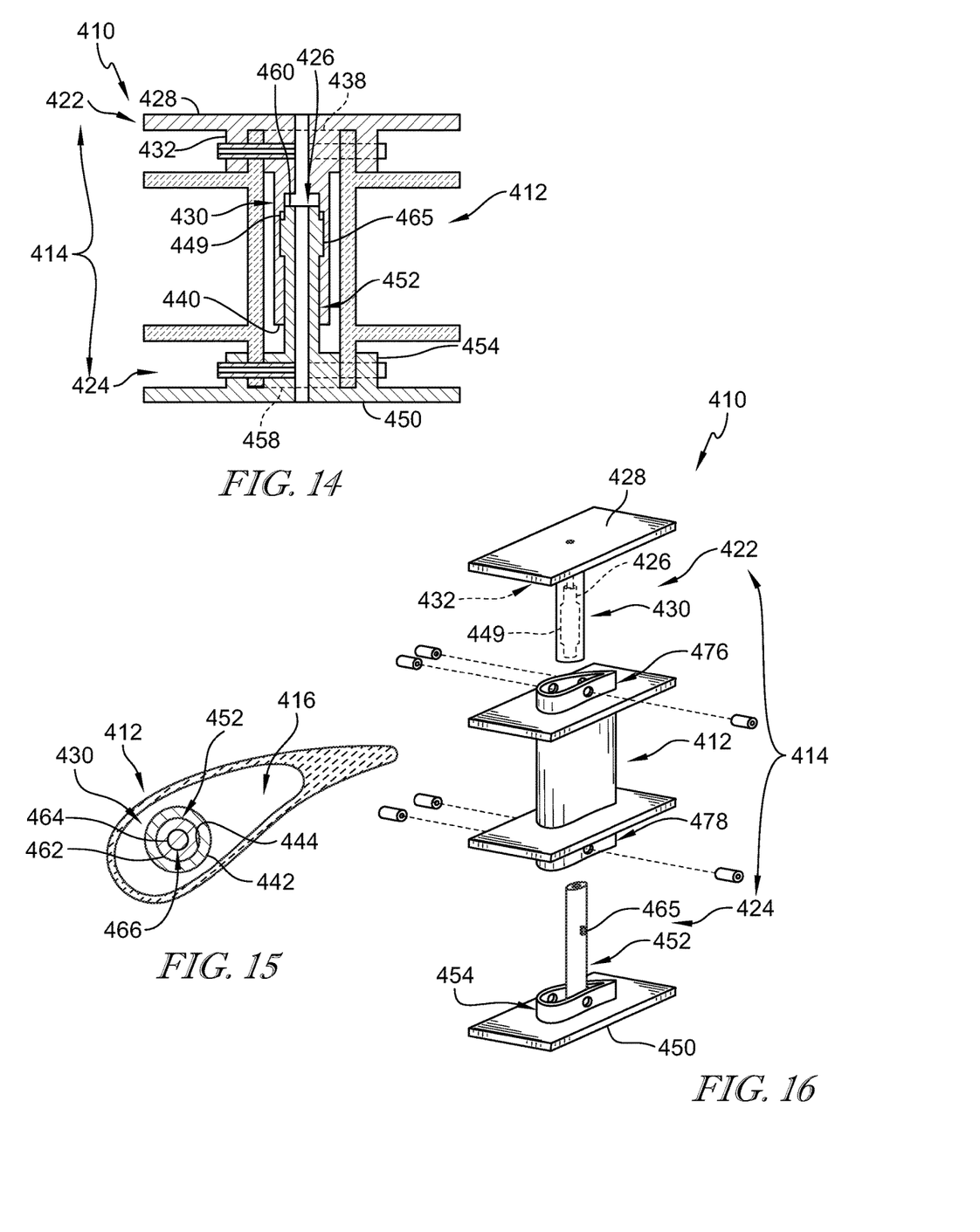
FIG. 14 is a cross-section view taken of a fourth embodiment of a turbine vane assembly adapted for use in the gas turbine engine taken along line 2-2 showing the turbine vane assembly includes a turbine vane and a metallic spar support that supports the turbine vane, and showing the spar support includes an outer support member that extends radially inward through a passageway of the turbine vane and an inner support member that extends radially partway into outer support member to slidably couple with the outer support member to allow relative movement between the metallic materials of the spar support that may be thermal expansion of the spar support while it is fixed to the ceramic matrix composite materials of the turbine vane.
FIG. 15 is a cross-section view of the turbine vane assembly of FIG. 14 taken along line 3-3 showing the outer support member is circular in cross-section and includes a spar-receiving passageway that receives the inner support member that is also cross-section for sliding movement therein.
FIG. 16 is an exploded view of the turbine vane assembly of FIG. 14 showing the turbine vane assembly further includes load transfer pins that couple the turbine vane to the spar support and extend through vane mounts of the turbine vane at both radially inner and outer ends of the vane and into an outer retainer collar of the outer support member and an inner retainer collar of the inner support member to transfer loads from the vane to the spar support.

Another embodiment of a turbine vane assembly 410 in accordance with the present disclosure is shown in FIGS. 14-16. The turbine vane assembly 410 is substantially similar to the turbine vane assembly 10 shown in FIGS. 1-6 and described herein. Accordingly, similar reference numbers in the 400 series indicate features that are common between the turbine vane assembly 10 and the turbine vane assembly 410. The description of the turbine vane assembly 10 is incorporated by reference to apply to the turbine vane assembly 410, except in instances when it conflicts with the specific description and the drawings of the turbine vane assembly 410.

The turbine vane assembly 410 includes a turbine vane 412 and a spar support 414 as shown in FIG. 14. The turbine vane 412 is shaped to interact with hot gases moving through the primary gas path 15 of the gas turbine engine. The spar 414 extends radially through a passageway 416 formed in the turbine vane 412 to support the turbine vane 412 in a desired location relative to other components, such as the turbine case 20, within the gas turbine engine.

The spar support 414 includes an outer support member 422 and an inner support member 424 as shown in FIGS. 14-16. The outer support member 422 and the inner support member 424 accommodate the difference in coefficients of thermal expansion between the ceramic matrix composite vane 412 and the spar support 414. The outer and inner support members 422, 424 are fixed relative to the turbine vane 412 to transfer aerodynamic loads of the vane 412, while the inner support member 424 is coupled to the outer support member 422 to slide relative to the outer support member 422 in a radial direction toward and away from the central reference axis 11.

The outer support member 422 includes an outer mount panel 428, an outer rod 430, and an outer retainer collar 432 as shown in FIGS. 14-16. The outer mount panel 428 is arranged radially outward of an outer vane mount 476 of the turbine vane 412 and is coupled to the turbine case 20 to support the turbine vane assembly 412 relative to the turbine case 20. The outer rod 430 extends radially inward from the outer mount panel 428 into the passageway 416 of the turbine vane 412. The outer retainer collar 432 extends radially inward from the outer mount panel 428 and couples to the outer vane mount 476 the turbine vane 412.

The outer rod 430 of the outer support member 422 is shaped to define a spar-receiving channel 426 that extends radially at least partway through the outer rod 430. The spar-receiving channel 426 receives a portion of the inner support member 424 to slidably couple the outer support member 422 and the inner support member 424.

The outer rod 430 includes a radially-outer end 438, a radially-inner end 440, an outer surface 442, and an inner surface 444 shown in FIGS. 14 and 15. The radially-outer end 438 interfaces the outer retainer collar 432. The radially-inner end 440 is arranged radially inward of the radially-outer end 438 to define the radial length L1 of the outer rod 430. The outer surface 442 extends between and interconnects the radially-outer end 438 and the radially-inner end 440 and faces an innermost surface of the turbine vane 212 defining the passageway 416. The inner surface 444 is arranged opposite the outer surface 442 and defines the spar-receiving channel 426.

In the illustrative embodiment, the outer rod 430 is also shaped to include radial guide channels 449 as shown in FIGS. 14 and 16. The guide channels 449 extend from the inner surface 444 toward the outer surface 442 into the outer rod 430. The guide channels 449 are configured to receive features 465 on the inner support member 424 to limit the radial growth between the inner support member 424 and the outer support member 422.

In the illustrative embodiment, the guide channels 449 extend only partway along the radial length L1 of the rod. The guide channels are sized to be at least the magnitude of the relative thermal expansion between the ceramic matrix composite materials and the metallic materials.

The inner support member 424 includes an inner mount panel 450, an inner rod 452, and an inner retainer collar 454 as shown in FIG. 14-16. The inner mount panel 450 is arranged radially inward of the radially-inner end of the turbine vane 412. The inner rod 452 extends radially outward from the inner mount panel 450 into the spar-receiving channel 426 formed in the the outer support member 422. The inner retainer collar 454 extends radially outward from the inner mount panel 450 and couples to an inner vane mount 478 of the turbine vane 412.

The inner rod 452 includes a radially-inner end 458, a radially-outer end 460, an outer surface 462, and an inner surface 464 as shown in FIGS. 14 and 15. The radially-inner end 458 interfaces the inner mount panel 450. The radially-outer end 460 is arranged radially outward of the radially-inner end 58 to define theradial length L2 of the inner rod 452. The outer surface 462 extends between and interconnects the radially-inner end 458 and the radially-outer end 460 of the inner rod 452 and faces the inner surface 444 of the outer rod 430 defining the spar-receiving channel 426.

The inner rod 452 is also shaped to include radial stops 465 as shown in FIGS. 14 and 16. The radial stops 465 extend from the outer surface 262 of the inner rod 452 and into the guide channels 449 of the outer rod 430. The radial stops 465 are configured to limit the radial growth of the inner support member 424 relative to the outer support member 422.

In the illustrative embodiment, the outer rod 430 and inner rod 452 are cylindrical in cross section when viewed in the radial direction relative to the central axis 11. The spar-receiving channel 426 is cylindrical in shape to mate with the cylindrical shape of the inner rod 452.

The present disclosure relates to a turbine vane assembly 10, 210, 310, 410 that manages the coefficient of thermal expansion mismatch between the ceramic matrix composite vane 12, 212, 312, 412 and the metallic support structure 14, 214, 314, 414. The turbine vane assembly 10, 210, 310, 410 accounts for the relative thermal growth mismatch between the ceramic matrix composite vane 12, 212, 312, 412 and the metallic support structure 14, 214, 314, 414 through the application of compliance through a two piece support structure 14, 214, 314, 414. In other ceramic matrix composite vane arrangements, this material mis-match is typically accounted for by using a spring or other compliant feature.

In the illustrative embodiments, the load from vanes 12, 212, 312, 412 is transmitted outboard to the high-pressure turbine casing 20. In metallic embodiments, the turbine vane assembly structure is supported on hooks and/or rails attached to the outer platform. However, the hook/rail design does not work for structures manufactured from the lower strength SiC/SiC ceramic matrix composite materials. Therefore, in some ceramic matrix composite vanes embodiments, a metallic spar is often incorporated in addition to conventional hook/rail joints.

The present disclosure teaches transferring the aerodynamic loading at both the inner and outer extents of the vane 12, 212, 312, 412. The load may be transmitted from the vane 12, 212, 312, 412 through a metallic structure or spar 14, 214, 314, 414 out into the casing 20. However, the ceramic matrix composite material has a significantly lower coefficient of thermal expansion compared to the high temperature metals of the spar 14, 214, 314, 414. Therefore, the components of the turbine vane assembly 10, 210, 310, 410 has a significant mismatch in radial height between cold build and the hottest operating conditions.

The present disclosure relates to a means of transferring the aerodynamic loading imparted on the ceramic turbine vane 12, 212, 312, 412. The metallic support structure 14, 214, 314, 414 may be split into two or more elements to introduce compliance and over-stressing the ceramic matrix composite structure 12, 212, 312, 412. The two metallic support elements 22, 24, 222, 224, 322, 324, 422, 424 still transmits the axial load imparted from the inter-stage seal. Optionally, if the ceramic matrix composite vane loading is shared between the inner/outer attachments, then the support elements 22, 24, 222, 224, 322, 324, 422, 424 may also transmit the circumferential load. The ceramic matrix composite vane 12, 212, 312, 412 may be radially restrained to both metallic support elements 22, 24, 222, 224, 322, 324, 422, 424 such that the axial (or axial & circumferential) load is shared between the inner/outer attachments.

The net load direction on the ceramic matrix composite structure 12, 212, 312, 412 may be sensitive to the secondary air system pressures and may be tailored to bias the ceramic matrix composite vane 12, 212, 312, 412 in one-direction. The load may also sensitive to the physical size of the turbine vane 12 as the outer platform 72, is radially outboard of the inner platform 74, the piston area is greater.

The spar joint is dependent on the net load direction. In some embodiments, if the net load may be outboard, then as the spar 14, 214, 314, 414 thermally expands greater than the ceramic matrix composite materials of the turbine vane 12, 212, 312, 412, the loading of the turbine 12, 212, 312, 412 will stay engaged with the outboard load transfer features, regardless of the movement of the spar 14, 214, 314, 414. This means that the spar will need to be built with a gap that will close upon thermal expansion. The size of the gap must be at least the magnitude of the relative thermal expansion between the ceramic matrix composite and spar or the ceramic matrix composite would be over-stressed at inner/outer attachment features In other embodiments, if the net load is inboard then as the spar 14, 214, 314, 414 thermally expands greater than the ceramic matrix composite materials of the turbine vane 12, 212, 312, 412, the ceramic matrix composite load will act to disengage the inner support member element 24, 224, 324, 424 from the outer and a radial stop is required to prevent the ceramic matrix composite platforms contacting as the segmented ceramic matrix composite ring contracts. In the illustrative embodiments of FIGS. 2-6, the spar support 14 includes an airfoil-shape joint between the outer and inners support member 22, 24 and may minimize the stresses in the metallic structure 14.

Both elements 22, 24 may be hollow to permit cooling flow to transit through the structure 14, from the outer cavity towards the inner. Alternatively, the outer element 222 may be hollow to allow turbine vane 212 cooling into the cavity. The cooling impingement channel 246 this passage does not need to extend into the inner element 224 if the height of the interface is appropriately positioned.

The location of the inner/outer split may be a balance of overall part stiffness as airfoils may have a longer chord/fatter further outboard (as the gas moves faster). Therefore the wall thickness of each element 22, 24 may be larger.

In other embodiments, the split may be moved as radially inboard as possible relative to the central axis 11 to minimize relative movement of the inner carrier as the inner element 24 inevitably rotates within the outer element 22.

In the illustrative embodiment of FIG. 8, the longest possible inner element 224 extends beyond the outer carrier 228. The outer support member 222 also includes an outer extension collar 234 in this region around the element 224 to reduce rotation of the inner element 224.

The sliding joint should not be an interference fit between therouter and inner support members 22, 24. An interference fit may prevent relative movement between the two elements 22. 24. However, the size of the gap G3 between the inner and outer elements 22, 24 should be minimized to prevent rotation of the inner carrier 22. Furthermore, the tighter the fit, the better the load sharing within the structure 14 i.e. moves towards face contact rather than point or line contact.

To achieve a good fit, the two elements 22, 24 may be accurate machined with careful control of the surface finish and precise orientation of both sets of ceramic matrix composite attachment features 32, 54. Optional coatings 68 may be applied to encourage sliding/anti-fret. Similar materials may be used for the two elements 22, 24 to minimize thermal expansion mismatches.

In some embodiments, the outer carrier 28 may be on the outer perimeter to maximize the second moment of area of the structure 10. This arrangement may tolerate the opposite but this would likely result in a higher stress/higher weight solution. Maximizing the second moment area of the outer mount panel 28 reduces stresses and allows optimization of the weight of the spar support 14 by balancing wall thickness and overall size. In some embodiments, the spar support 14 is tapered with the outer support element 22 being larger than the inner support member 24. The larger outer support element 22 may be mounted to the turbine case 20.

In the illustrative embodiments of FIGS. 11 and 14, the spar support 314, 414 includes cylindrical elements. The spar support 414 includes cylindrical inner and outer elements 422, 424 that transfer of axial load but not circumferential loads. The spar support 314 includes a cylindrical inner element 324, but an airfoil cross section outer element 322 that may transfer circumferential loading of the turbine vane 312. This arrangement may simplify the manufacturing of both elements 322, 324 and may allow the use of standard reaming tools.

In the embodiment of FIG. 11, the airfoil circumferential load may only be transmitted at the outboard 322. Therefore, any ceramic matrix composite load transfer features must be slotted/oriented to only react axial loads at the inner element 322.

In the embodiment of FIG. 14, the cylindrical inner element 424 and the airfoil shaped outer element 422 may maximize the second moment of area, reducing stresses. This arrangement may allow for better control of the transfer of cooling flows if a dedicated cavity is used.

The present disclosure teaches a simple solution to a significant design challenge and provides method for attachment and load transfer between coefficient of thermal expansion mismatch between structures. The split structure may be used in a range of ceramic matrix composite attachment features and the same style attachment can be used at both inner and outer ends.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly adapted for use in a gas turbine engine, the assembly comprising
    a turbine vane comprising ceramic matrix composite materials adapted for use in high temperature environments, the turbine vane formed to include (i) an airfoil shaped to interact with hot gases moving through a primary gas path of the gas turbine engine, (ii) an outer vane mount arranged radially outward of the primary gas path relative to a central reference axis of the gas turbine engine, and (iii) an inner vane mount arranged radially inward of the primary gas path relative to the central reference axis of the gas turbine engine, and
    a spar support comprising metallic materials that extends radially through a passageway formed through the turbine vane to support the turbine vane in a desired location relative to other components within the gas turbine engine, the spar support including an outer support member fixed to the outer vane mount so as to receive loads from the outer vane mount and an inner support member fixed to the inner vane mount so as to receive loads from the inner vane mount,
    wherein the inner support member is coupled to the outer support member to slide relative to the outer support member in a radial direction toward and away from the central reference axis so as to change the effective radial length of the spar support and accommodate different rates of thermal expansion experienced by the ceramic matrix composite materials of the turbine vane and the metallic materials of the spar support during use in the gas turbine engine.

2. The turbine vane assembly of claim 1, wherein the outer support member is shaped to define a spar-receiving channel that extends radially at least partway through the outer support member and receives a portion of the inner support member to slidably couple the outer support member and the inner support member.

3. The turbine vane assembly of claim 2, wherein the spar-receiving channel is sized to allow a gap between an inner surface of the outer support member that defines the spar-receiving channel and an outer surface of the portion of the inner support member received in the spar-receiving channel.

4. The turbine vane assembly of claim 3, wherein the turbine vane assembly further includes a low-friction coating applied to one of the inner surface of the outer support member and the outer surface of the inner support member having a coefficient of friction lower than that of the outer support member and the inner support member to encourage sliding between the outer support member and the inner support member.

5. The turbine vane assembly of claim 2, wherein the outer support member includes an outer mount panel arranged radially outward of the outer vane mount of the turbine vane and an outer rod that extends radially inward from the outer mount panel into the passageway of the turbine vane, and wherein the inner support member includes an inner mount panel arranged radially inward of the inner vane mount of the turbine vane and an inner rod that extends radially outward from the inner mount panel into the spar-receiving channel formed in the outer support member.

6. The turbine vane assembly of claim 5, wherein the spar-receiving channel extends radially through the entire length of the outer support member and the inner rod of the inner support member received in the spar-receiving channel extends radially outward past the outer mount panel and into an outer mount extension included in the outer support member that extends radially outward from the outer mount panel and surrounds the inner rod.

7. The turbine vane assembly of claim 1, wherein the outer support member includes an outer mount panel arranged radially outward of the outer vane mount of the turbine vane, an outer retainer collar that extends radially inward from the outer mount panel and couples to the outer vane mount of the turbine vane, and an outer rod that extends radially inward from the outer mount panel into the passageway of the turbine vane and defines a spar-receiving channel, and wherein the inner support member includes an inner mount panel arranged radially inward of the inner vane mount of the turbine vane, an inner retainer collar that extends radially outward from the inner mount panel and couples to the inner vane mount of the turbine vane, and an inner rod that extends radially outward from the inner mount panel into the spar-receiving channel formed in the outer rod of the outer support member.

8. The turbine vane assembly of claim 7, wherein the turbine vane assembly further includes load transfer pins that couple the turbine vane to the outer support member and the inner support member of the spar support at the radially-outer end and the radially-inner end of the turbine vane, the load transfer pins including an outer mount pin that extends into the outer retainer collar through an outer aperture in the outer vane mount of the turbine vane to transfer loads at the radially-outer end of the turbine vane to the outer support member and an inner mount pin that extends into the inner retainer collar through an inner aperture in the inner vane mount of the turbine vane to transfer loads at the radially-inner end of the turbine vane to the inner support member.

9. The turbine vane assembly of claim 1, wherein the outer support member is configured to be coupled to a turbine case to support the turbine vane assembly relative to the turbine case, and wherein a sliding interface between the inner support member and the outer support member is configured such that substantially all radial loading applied to the turbine vane during use in the gas turbine engine is transmitted through the outer support member to the turbine case bypassing the inner support member.

10. The turbine vane assembly of claim 9, wherein the sliding interface between the inner support member and the outer support member is configured such that circumferential and axial loads applied to the turbine vane during use in the gas turbine engine are transmitted through both the inner support member and the outer support member before being passed to the turbine case.

11. A turbine vane assembly adapted to be mounted around a central reference axis, the assembly comprising
 a turbine vane that includes (i) an airfoil shaped to interact with hot gases, (ii) an outer vane mount arranged radially outward of the airfoil, and (iii) an inner vane mount arranged radially inward of the airfoil, and
 a spar support that extends radially through a passageway formed through the turbine vane, the spar support including an outer support member fixed to the outer vane mount and an inner support member fixed to the inner vane mount, wherein the inner support member is coupled to the outer support member to slide relative to the outer support member in a radial direction toward and away from the central reference axis.

12. The turbine vane assembly of claim 11, wherein the outer support member includes an outer mount panel arranged radially outward of the outer vane mount of the turbine vane and an outer rod that extends radially inward from the outer mount panel into the passageway of the turbine vane, and wherein the inner support member includes an inner mount panel arranged radially inward of the inner vane mount of the turbine vane and an inner rod that extends radially outward from the inner mount panel into a spar-receiving channel formed in the outer support member that extends radially at least partway through the outer support member to slidably couple the outer support member and the inner support member.

13. The turbine vane assembly of claim 12, wherein the outer rod of the outer support member is airfoil shaped in cross section when viewed in the radial direction relative to the central axis.

14. The turbine vane assembly of claim 13, wherein the inner rod of the inner support member is airfoil shaped in cross section when viewed in the radial direction relative to the central axis and the inner support member is shaped to include a cooling cavity that extends radially through the inner support member.

15. The turbine vane assembly of claim 13, wherein the inner rod is circular in cross section when viewed in the radial direction relative to the central axis and the inner support member is shaped to include a cooling cavity that extends radially through the inner support member.

16. The turbine vane assembly of claim 12, wherein the outer support member is shaped to define an impingement channel spaced axially forward of the spar-receiving channel toward a leading edge of the airfoil that extends radially through the outer support member, and wherein the outer rod is shaped to include impingement cooling holes arranged to discharge cooling air from the impingement channel toward the leading edge of the airfoil included in the turbine vane to provide some cooling to an inner surface of the turbine vane that defines the passageway.

17. A turbine section assembly adapted for use in a gas turbine engine, the assembly comprising a turbine case that extends around a central reference axis,
 a turbine vane comprising ceramic matrix composite materials,
 the turbine vane formed to include (i) an airfoil shaped to interact with hot gases moving through a primary gas path, (ii) an outer vane mount arranged radially outward of the primary gas path, and (iii) an inner vane mount arranged radially inward of the primary gas path, and
 a spar support comprising metallic materials that extends from the turbine case and radially into a passageway defined within the turbine vane to support the turbine vane relative to the turbine case, the spar support including an outer support member fixed to the outer vane mount and an inner support member fixed to the inner vane mount, wherein the inner support member is coupled to the outer support member to slide relative to the outer support member in a radial direction toward and away from the central reference axis.

18. The turbine section of claim 17, wherein the outer support member is shaped to define a spar-receiving channel that extends radially at least partway through the outer support member and receives a portion of the inner support member to slidably couple the outer support member and the inner support member.

19. The turbine section of claim 18, wherein the outer support member includes an outer mount panel arranged radially outward of the outer vane mount of the turbine vane and coupled to the turbine case to support the turbine vane assembly relative to the turbine case and an outer rod that extends radially inward from the outer mount panel into the passageway of the turbine vane, and wherein the inner support member includes an inner mount panel arranged radially inward of the inner vane mount of the turbine vane and an inner rod that extends radially outward from the inner mount panel into the spar-receiving channel.

20. The turbine section of claim 19, wherein a sliding interface between the inner support member and the outer support member is configured such that substantially all radial loading applied to the turbine vane during use in the gas turbine engine is transmitted through the outer support member to the turbine case bypassing the inner support member, and wherein the sliding interface between the inner support member and the outer support member is configured such that circumferential and axial loads applied to the turbine vane during use in the gas turbine engine are transmitted through both the inner support member and the outer support member before being passed to the turbine case.

* * * * *